United States Patent
Quintel

(10) Patent No.: US 6,592,758 B2
(45) Date of Patent: Jul. 15, 2003

(54) FILTER ELEMENT FOR A LIQUID-STATE PROCESS STREAM

(75) Inventor: Mark A. Quintel, Kalamazoo, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/140,972

(22) Filed: May 8, 2002

(65) Prior Publication Data

US 2002/0185421 A1 Dec. 12, 2002

Related U.S. Application Data

(62) Division of application No. 09/499,017, filed on Feb. 4, 2000, now abandoned.

(51) Int. Cl.[7] .......................... B01D 29/37; B01D 29/66; B01D 29/68; B01D 35/02; B01D 35/12

(52) U.S. Cl. .................. 210/232; 210/411; 210/333.1; 210/445; 210/446; 210/450

(58) Field of Search ................. 210/232, 445, 210/446, 450, 411, 333.1

(56) References Cited

U.S. PATENT DOCUMENTS

| | | | |
|---|---|---|---|
| 2,237,964 A | | 4/1941 | Haught |
| 2,808,937 A | * | 10/1957 | O'Meara |
| 3,318,452 A | | 5/1967 | Adams |
| 3,421,631 A | * | 1/1969 | Hirsch |
| 3,445,002 A | | 5/1969 | Muller |
| 3,622,007 A | * | 11/1971 | Pappathatos |
| 3,692,178 A | | 9/1972 | Reece |
| 3,703,465 A | | 11/1972 | Reece et al. |
| 3,707,832 A | * | 1/1973 | Muller et al. |
| 3,771,664 A | | 11/1973 | Schrink et al. |
| 3,847,817 A | | 11/1974 | Jarman |
| 4,059,518 A | | 11/1977 | Rishel |
| 4,157,964 A | | 6/1979 | Rishel |
| 4,415,448 A | | 11/1983 | Lennartz et al. |
| 4,430,220 A | | 2/1984 | Litzenburger |
| 4,582,603 A | | 4/1986 | Nasse |
| 5,628,964 A | * | 5/1997 | Tassitano |
| 5,792,373 A | | 8/1998 | Bennick et al. |
| 5,989,421 A | | 11/1999 | Davis et al. |

OTHER PUBLICATIONS

Apr. 1994, *Adams Poro–Edge Water Strainers*, Product Brochure, Title page, 5 pages.

Dec. 1998, *Hydac International*, AutoFilt RF3, Product Brochure, Title page, 7 pages.

* cited by examiner

Primary Examiner—Thomas M. Lithgow
(74) Attorney, Agent, or Firm—Flynn, Thiel, Boutell & Tanis, P.C.

(57) ABSTRACT

A filter element assembly used to filter liquid-state process stream. The assembly includes first and second tubes. A ring is seated in one of the tubes. One or more filter elements extend from the ring into one of the tubes. The ring has a lip that extends beyond the outside of the tubes. Opposed open ends of the tube abut opposed surfaces of the ring lip. A seal surrounds the open ends of the tube and the ring lip. A clamp surrounds the seal. Liquid that flows between the ends of the tubes and the ring lip forces the seal against the clamp and the outer tubes to prevent the liquid from flowing beyond the seal.

23 Claims, 9 Drawing Sheets

FILTER ELEMENT FOR A LIQUID-STATE PROCESS STREAM

RELATIONSHIP TO EARLIER FILED APPLICATION

This application is a divisional of U.S. patent application Ser. No. 9/499,017, filed Feb. 4, 2000, now abandoned.

FIELD OF THE INVENTION

This invention relates generally to a filter element for filtering a liquid-state process stream.

BACKGROUND OF THE INVENTION

Filter assemblies are used in many industrial facilities to selectively remove material from liquid-state process streams. Filter assemblies are used to both remove undesirable contaminates from process streams and to extract desirable filtrates out of process streams.

One type of filter assembly used in an industrial facility is a backwash filter assembly. This type of filter assembly typically includes a number of filter element sub-assemblies that are connected at opposed ends to common inlet and outlet manifolds. Liquid to be filtered is introduced to the filter element sub-assemblies through the inlet manifolds. The filtered liquid is ported from the filter element sub-assemblies through the outlet manifold. A flow diverter is positioned inside the inlet manifold of this assembly. The flow diverter is able to selectively connect the inlet end of each filter element sub-assembly to a drain line. A drive assembly, located outside of the inlet manifold, selectively moves the flow diverter between the individual filter element sub-assemblies.

When the filter assembly is in use, the liquid to be filtered flows through filter elements internal to the filter assembly. The material removed by the filter elements becomes trapped on the outer surfaces of the elements. Over time, a significant amount of trapped material builds up on the filter elements. The build up of this material eventually impedes the flow of liquid across the filter elements. In other words, the build up of this material causes a relatively large pressure drop to develop across the filter elements. In order to maintain the liquid flow through the filter elements at a reasonable rate, it is necessary to periodically remove the material that has adhered to the filter elements. This material removal is accomplished by backwashing the filter elements.

In backwashing, the flow diverter is set so as to establish a fluid communication path between the filter element to be backwashed and the drain line. A backwash liquid is flowed through the filter element in the direction opposite the direction through which the liquid that is filtered is flowed. Often, but not always, this backwash liquid is the filtered liquid that has just been discharged from the outlet ends of the remaining filter elements. The backwash liquid forces the material adhered to the side of the filter element off the filter element so the material flows down the drain. Often, a backwash filter system is operated so that the flow diverter periodically couples each filter element to the drain. By positioning the flow diverter in the inlet manifold, one filter element can be backwashed while the remaining filter elements continue to perform their filter function. Thus, a backwash filter system can both simultaneously filter the liquid that is flowed to it for filtering and backwash one of its filter elements.

Two backwash filter systems are disclosed in the Applicant's Assignee's U.S. Pat. Nos. 3,703,465 and 4,059,518.

While current backwash filter systems work reasonably well, there are some limitations associated with their use. The flow diverter of a typical backwash filter system is often subjected to the force of the stream of liquid that is introduced into the inlet manifold for filtering. The force of this liquid stream may cause the diverter to shift position. More particularly, the force of this fluid stream may cause unwanted rotational movement of the flow diverter when it is indexed from connection with one filter element to connection with a second fluid element. Thus, the drive assemblies of available flow diverters are typically provided with brake assemblies. These brake assemblies precisely regulate the rotational movement of the flow diverters to which they are attached. The need to provide this type of brake assembly typically adds to the cost of providing a backwash filter system.

Moreover, this type of brake assembly typically has at least two components that bear against each other. Over time, these components wear to the point at which they need to be replaced. Thus, the need to have to maintain the brake assembly incorporated into a backwash filter system contributes to the overall cost of maintaining the system.

Moreover, many backwash filter systems are designed so that the flow diverter internal to the system tightly seals against the opening of the filter element sub-assembly against which it is aligned. In order to maintain this seal, the flow diverter is typically pressed against an adjacent surface of the inlet manifold. This pressure typically results in the asymmetric loading of both the flow diverter and the seals located around the flow diverter. This asymmetric loading of these components, especially the seals, significantly accelerates the rate at which these components wear out and need to be replaced.

Still another disadvantage associated with backwash filter systems, as well as other kinds of filter systems, concerns the sub-assemblies used to hold the filter elements in their complementary housings. This sub-assembly must, naturally, provide a liquid tight barrier around the head end of the filter element with which it is associated in order to foster the operation of the element. Secondly, this sub-assembly must allow the filter element to be removable from the housing. Clearly, this is desirable so as to make it possible to replace, clean or repair the filter element as needed. However, these two objectives are, to a great extent, contradictory. Accordingly, the present sub-assemblies used to hold filter elements in their housings tend to be complex and/or expensive to provide.

SUMMARY OF THE INVENTION

This invention relates generally to a new and useful backwash filter system. The backwash filter system of this invention includes a flow diverter sub-assembly that is both economical to provide and relatively maintenance free to operate. The filter system of this invention also includes a coupling assembly for removably coupling a filter element into the complementary housing in which it is seated. The coupling assembly of this invention, in addition to providing the requisite liquid-tight barrier and allowing the filter element to be removed, is economical to provide.

BRIEF DESCRIPTION OF THE DRAWINGS

The invention is pointed out with particularity in the claims. The above and further features of this invention may be better understood by reference to the following description taken in conjunction with the accompanying drawings, in which:

DETAILED DESCRIPTION

Figure 1:
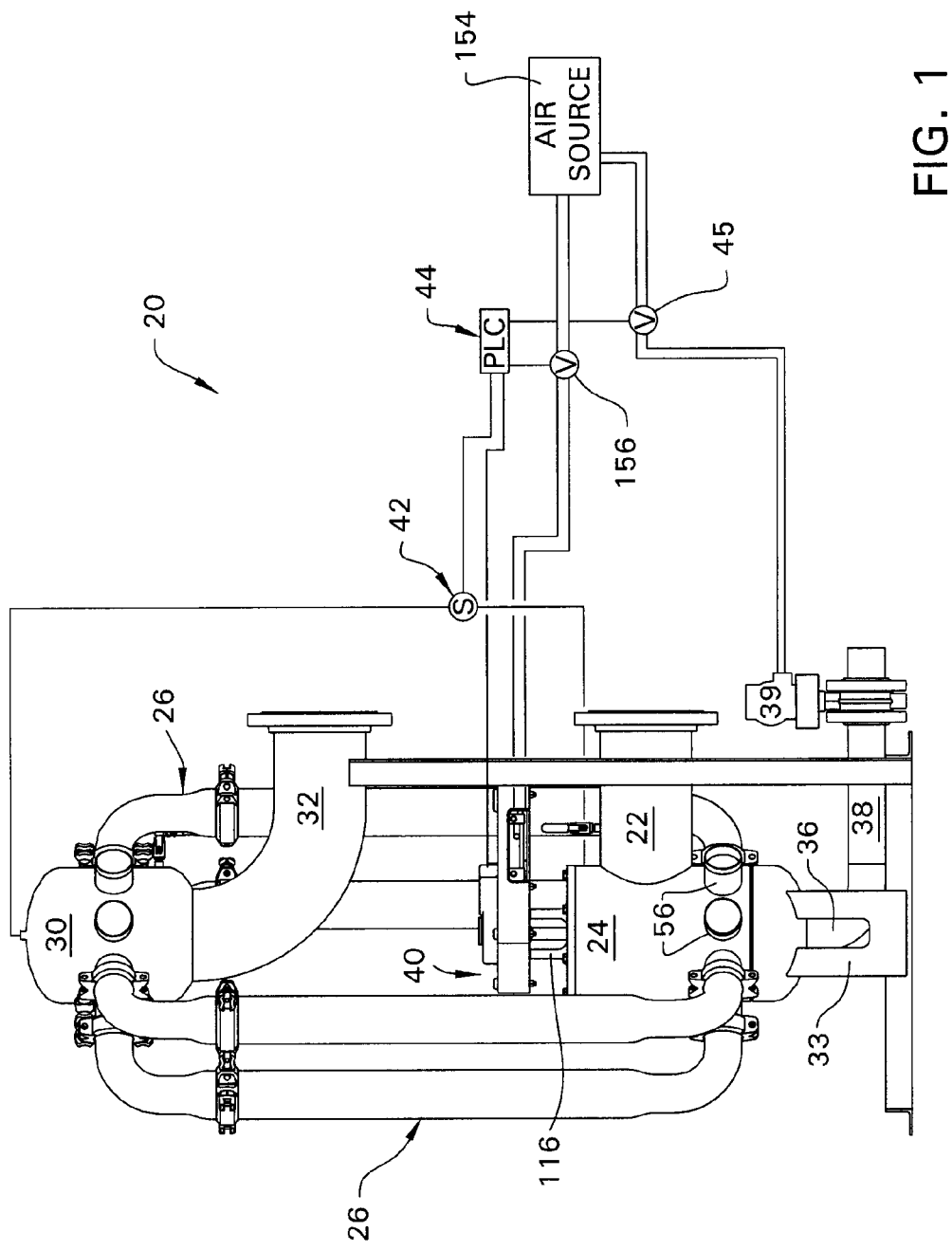
FIG. 1 is a side view of a backwash filter assembly of this invention.
Figure 2:
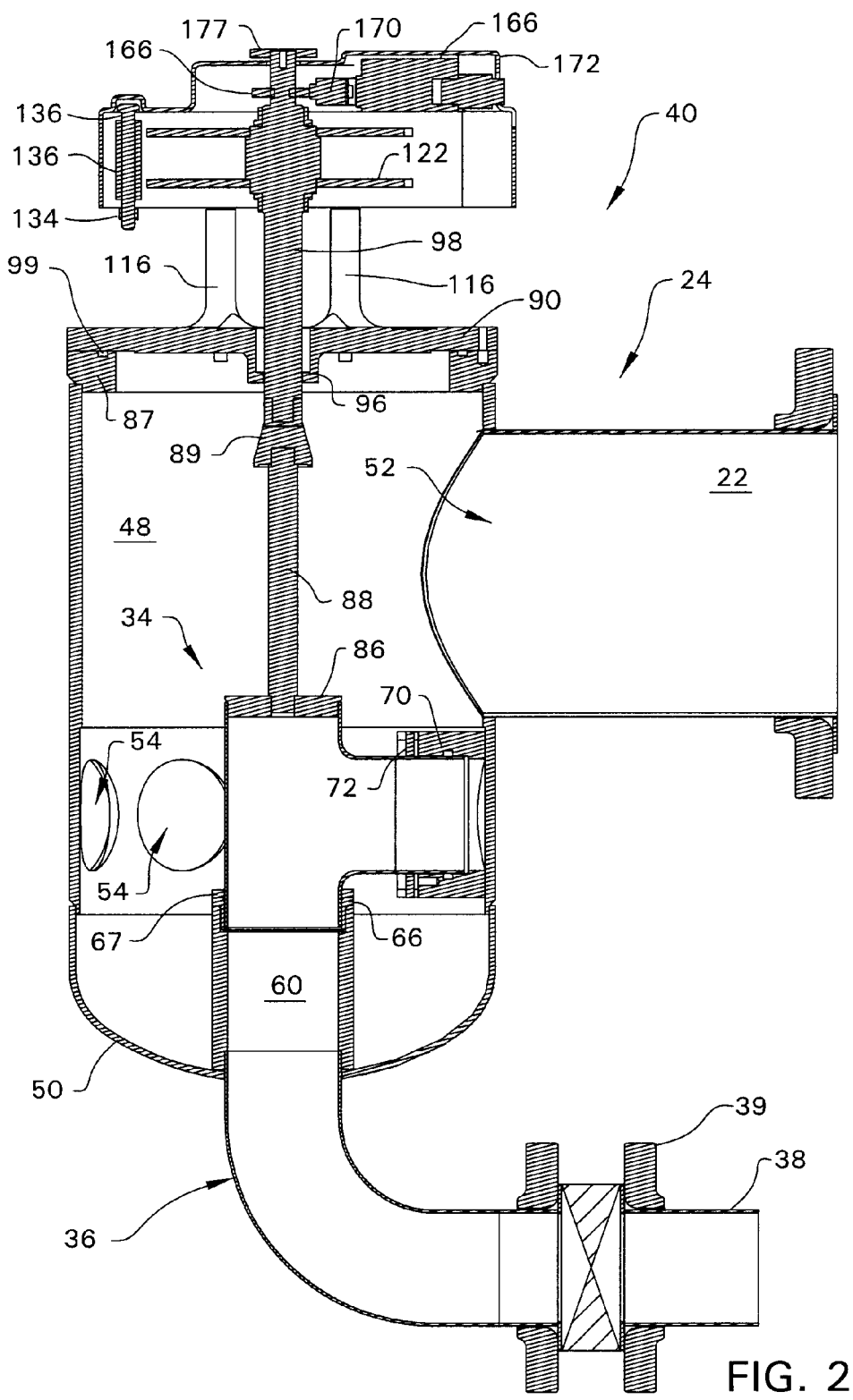
FIG. 2 is a cross section view of the inside of the inlet manifold of the assembly of this invention in which the components forming the flow diverter are depicted.

FIGS. 1 and 2 depict the filter assembly 20 of this invention. The assembly 20 includes an inlet pipe 22 through which the liquid to be filtered is introduced into the assembly. The outflow end of the inlet pipe 22 is connected to a generally circularly-shaped closed inlet manifold 24. A number of filter element sub-assemblies 26 are connected to the inlet manifold 24. Each sub-assembly 26 contains a filter element 28

(FIG. 3) through which the liquid is flowed in order to remove a material from the flow stream. In the depicted version of the invention, filter assembly 20 includes eight filter sub-assemblies 26. In FIG. 1, two sub-assemblies 26 are not shown so that other components of the filter assembly 20 can be illustrated. The outlet ends of filter element sub-assemblies 26 are connected to a common outlet manifold 30. Outlet manifold 30 is a closed, circularly-shaped closed container located above and axially aligned with inlet manifold 24. An elbow-shaped outlet pipe 32 extends downwardly and outwardly away from the bottom of the outlet manifold 30. The liquid filtered by the assembly 20 is discharged from it through the outlet pipe 32. A frame 33, to which the inlet manifold 24 and pipe 32 are mounted, supports the rest of the assembly above ground level.

A flow diverter 34 is rotatably mounted in the inlet manifold 24. The flow diverter 34 is employed to selectively connect the inlet end of each filter element sub-assembly 26 to an elbow-shaped drain tube 36 that is fitted in the base of the inlet manifold. A drain pipe 38 is connected to the outlet end of the drain tube 36. Fluid flow downstream of the drain pipe 38 is controlled by a pneumatically actuated valve 39 in-line with the drain pipe. A drive assembly 40 located immediately above the inlet manifold 24 controls the displacement of the flow diverter 34. Whenever the flow diverter 34 is placed in registration with the inlet end of one of the filter element-sub assemblies 26, a fraction of the filtered liquid discharged from the remaining sub-assemblies 26 is flowed through the outlet manifold 30 to the selected sub-assembly. This fluid flow functions as a backwash flow that forces caked filtrate off the outer surface of the filter element 28 of the selected sub-assembly 26. The backwash flow, including the removed filtrate, is then flowed away from the filter assembly 20 through drain tube 36 and drain pipe 38.

A differential pressure switch 42 is connected to the inlet and outlet manifolds 24 and 30, respectively. The switch 42 receives a pressure head from both manifolds 24 and 30 and outputs a signal whenever the difference in pressures is above a select level. A programmable logic controller 44 regulates both the opening and closing of drain pipe valve 39 and the actuation of the diverter drive assembly 40. The programmable logic controller (PLC) 44 receives as an input the signal generated by switch 42. While not illustrated, it should be understood that the programmable logic controller 44 also includes a key pad through which commands to manually override the controller's regulation of the operation of the filter assembly 20 can be entered. As discussed in more detail hereinafter, based on the differential pressure between the two manifolds 24 and 30, the time since the last backwashing and any manually entered commands, programmable logic controller 44 actuates drive assembly 40 and open/closes valve 39 to facilitate the backwashing of the filter elements 28.

With regard to valve 39, it should be understood that PLC 44 regulates the flow of air to control members internal to the valve from a source 154. More particularly, PLC 44 regulates the state of valve 45 which controls the air flow to valve 39.

The inlet manifold 24 has a circularly shaped shell 48. The opposed ends of shell 48 are open. An end cap 50 with a rounded profile is welded or otherwise permanently secured to the open bottom end of shell 48. Shell 48 is formed to have a circular inlet port 52. Inlet port 52 is the opening into the manifold 34 to which inlet pipe 22 is connected and through which liquid to be filtered is delivered into the manifold. The inlet manifold is further formed to a have a plurality of outlet ports 54 that are located in an arcuate, coplanar arrangement around the manifold shell 48. In a gravity orientation, it will be noted that outlet ports 54 are spaced below the space subtended by inlet port 52. A tubular shaped discharge nipple 56 extends around each outlet port 54. The discharge nipples 56 are welded or otherwise secured to the outer surface of shell 48 to extend away from the manifold 24.

The drain tube 36 is welded or otherwise permanently secured to the manifold end cap 50 to extend a short distance into the bottom of the inlet manifold 24. A small piece of pipe, referred to as a receiving pipe 60, is fitted over and is permanently secured to the end of the drain tube 36 that extends through the end cap 50.

Figure 3:
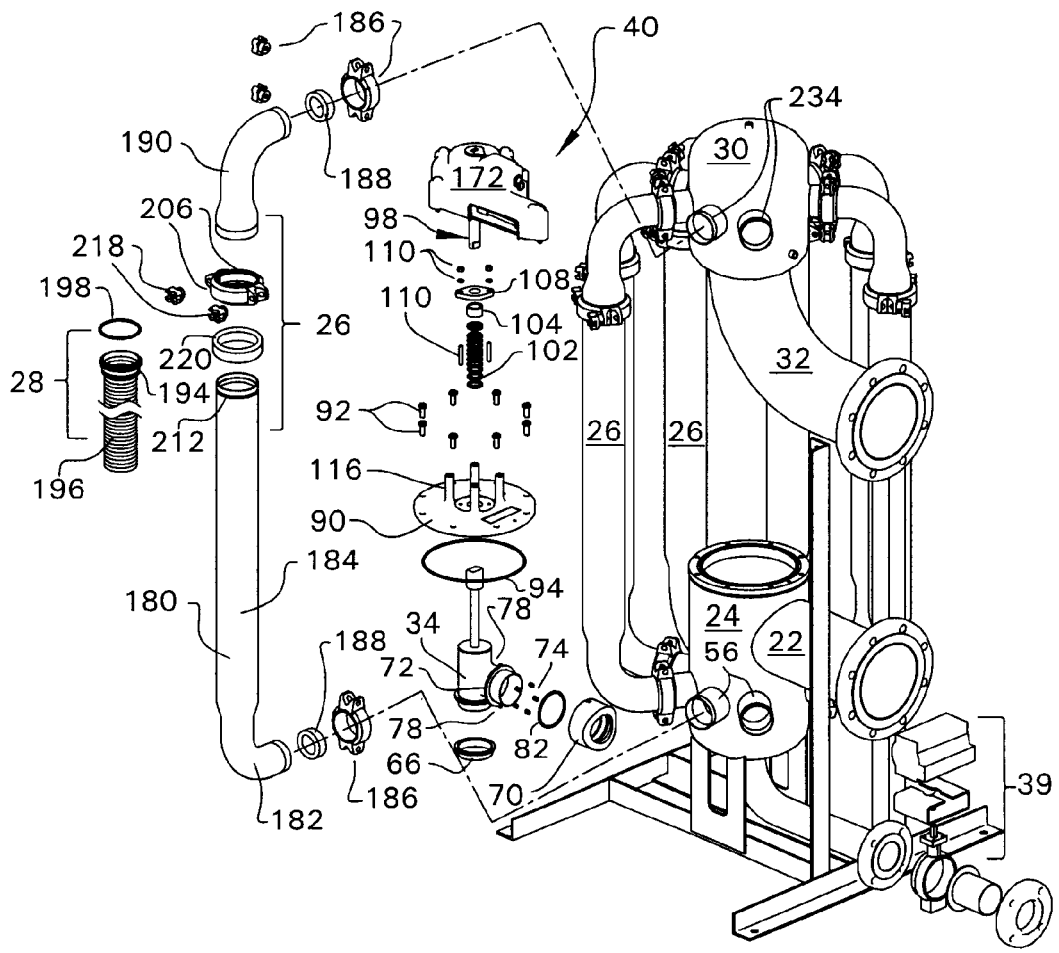
FIG. 3 is an exploded view of the filter assembly of this invention.
Figure 4:
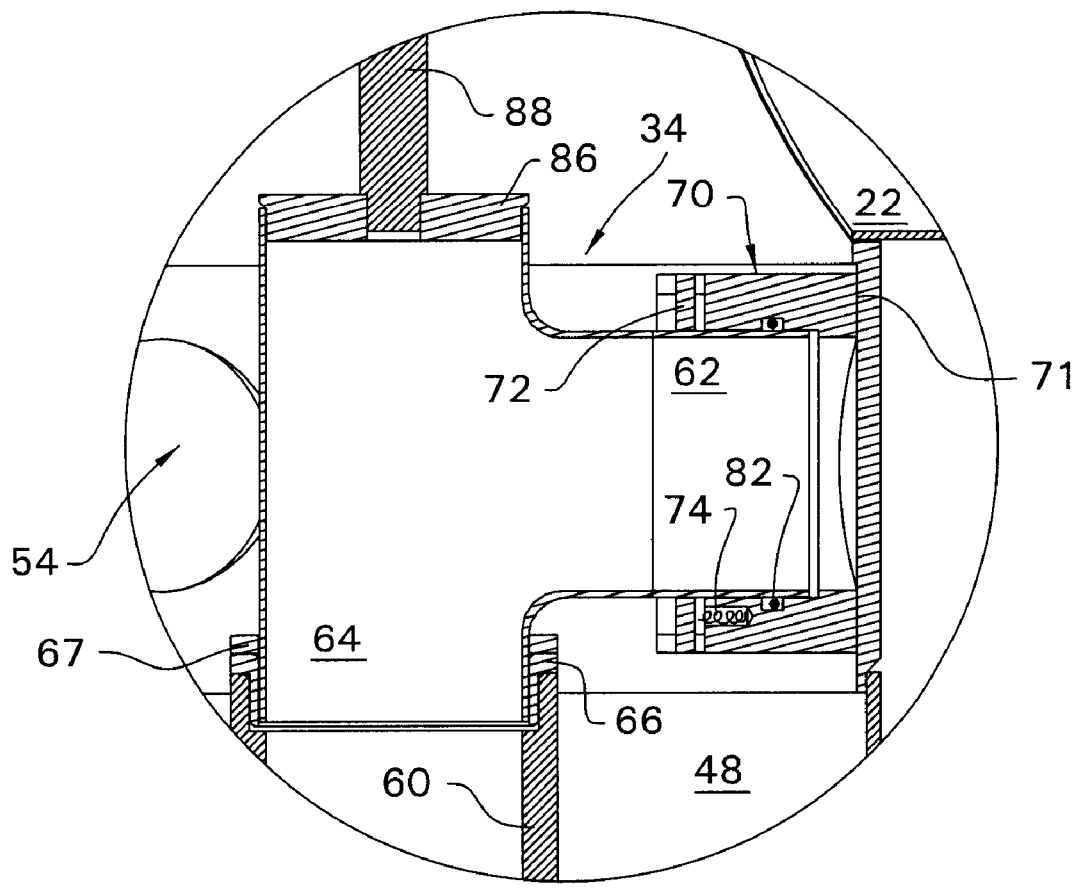
FIG. 4 is an enlarged cross sectional view of the flow diverter.

The flow diverter 34, now described by reference to FIGS. 2–4, is a T-shaped section of pipe that is rotatably mounted in the exposed top end of receiving pipe 60. More particularly, the flow diverter 34 has an inlet section 62 that is horizontally aligned and outlet section 64 that is vertically aligned. The flow diverter 34 is positioned in the inlet manifold 24 so that the outlet section is axially aligned with the longitudinal axis of the manifold. The open end of the diverter outlet section 64 is seated in the open end of the receiving pipe 60. More particularly, the open end of the diverter outlet section 64 is seated in a bushing 66 that extends around the inner wall of the open end of receiving pipe 60. Bushing 66 is formed from a polytetraflourine (TEFLON®) resin with embedded glass so as to provide a low friction interface between the diverter 34 and the receiving pipe 60. The low friction interface facilitates the rotation of the diverter 34 relative to the pipe 60. The bushing 60 does not, however, provide a liquid-tight seal between the flow diverter 34 and the receiving pipe 60. An annular flange 67 extends around diverter outlet section 64 at a location away from the open end of the diverter. Flange 67 abuts an outer surface of bushing 66.

Figure 5:
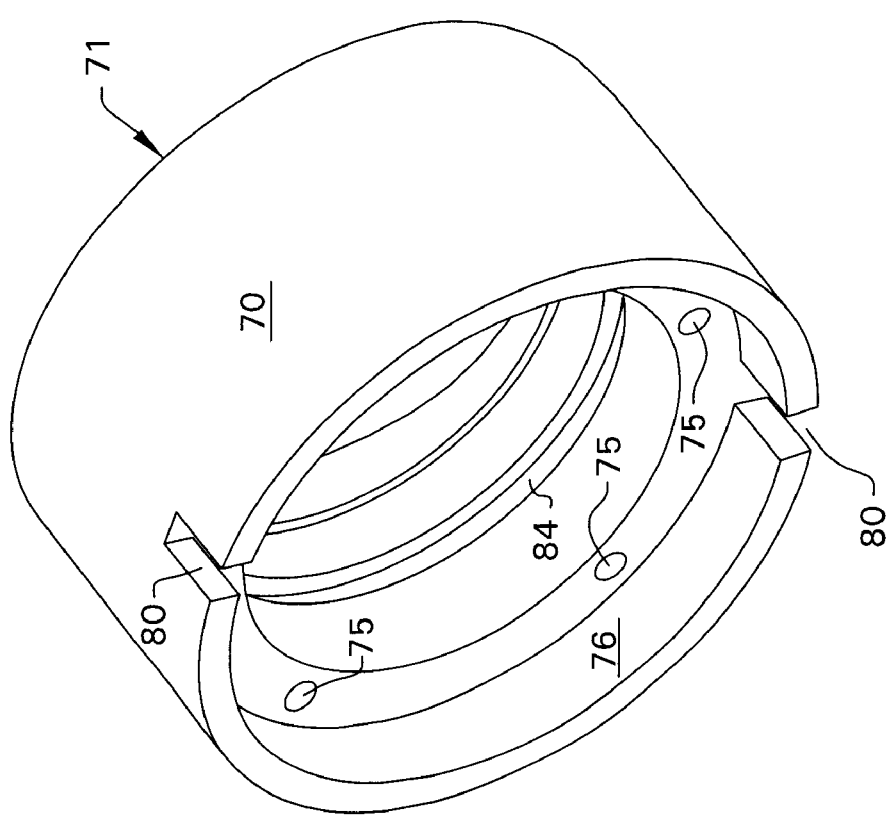
FIG. 5 is a perspective view of the outlet end of the seal integral with the flow diverter.

Flow diverter 34 is shaped so that the open end of the inlet section 62 can be selectively placed in registration with any one of the outlet ports 54 formed in the inlet manifold 24. Accordingly, it should be understood that the diverter inlet section 62 is spaced longitudinally away from the space subtended by inlet port 52, the space through which liquid is flowed into the manifold 24. An annular seal 70, now described by reference to FIGS. 4 and 5, is fitted around the open end of diverter inlet section 62. Seal 70 is formed out of the same material from which bushing 66 is formed. It will be observed that the seal 70 is formed so that its front face 71 has a curved profile that approximates the curvature of the inner wall of the inlet manifold 24. The rear end of the seal 70 abuts a flange 72 that extends radially outwardly and circumferentially surrounds the outer surface of the manifold inlet section 62. A set of springs 74 extend between the outwardly facing surface of flange 72 and the seal 70. More particularly, springs 74 are seated in small bores 75 formed in the rear end of the seal 70. The springs 74 urge the seal 70 outwardly so that the seal abuts the adjacent inner wall of the inlet manifold 24.

Seal 70 is further formed to have a lip 76 that extends rearwardly from and circumferentially surrounds the outer perimeter of the rear face of the seal. The outer surface of lip 76 is flush with the adjacent outer surface of the rest of the seal 70. When the seal 70 is seated over the diverter inlet section 62, lip 76 extends over flange 72. It will further be noted from FIG. 3, that flange 72 is shaped to have two diametrically opposed tabs 78 that project away from the outer perimeter of the flange. The seal 70 is formed so that lip 76 defines two diametrically opposed slots 80. When the seal 70 is fitted over the flow diverter 34, tabs 78 are seated in slots 80. Tabs 78 and slots 80 thus cooperate to prevent the seal from rotating relative to the diverter inlet section 62.

An O-ring 82 extends between the outer surface of the diverter inlet section 62 and seal 70. The O-ring 82 is seated in a groove 84 formed in the inner annular wall of the seal. The O-ring thus provides a liquid tight barrier between the seal 70 and the adjacent outer surface of the diverter inlet section. However, it should be understood that seal 70 does not form liquid-tight barrier with the adjacent inner wall of the inlet manifold 24. Small volumes of liquid may flow in the interstitial space between the front face 71 of the seal 70 and the adjacent inner wall of the inlet manifold 24.

A liquid-tight cap 86 is fitted over the end of the diverter 34 opposite the outlet section 64. A drive rod 88 is integrally attached to the top of the cap 86 and is axially aligned with the diverter outlet section 64. A drive shaft 98, which is part of the drive assembly 40, is secured to the end of drive rod 88. In the illustrated version of the invention, a collar 89 mates the drive rod 88 and drive shaft 98 together. A ring 87 is welded or otherwise permanently secured to the open top end of manifold shell 48. A generally disk-shaped lid 90 is secured over the top of ring 87. Bolts 92 removably secure the lid 90 to the ring 87. An O-ring 94 is disposed between the ring 87 and the adjacent surface of the lid 90 to provide a seal between these two components. The O-ring 94 is seated in an annular groove 99 formed in the open end face of the ring 87.

Lid 90 is formed so as to have a hollow boss 96 that extends inwardly from the center of the lid. Drive shaft 98 extends into the inlet manifold through an opening in boss 96, (opening not identified). A set of V-seals 102 is fitted around drive shaft 98. The V-seals 102 are seated in the recessed section of boss 96 that extends below the rest of the lid 90. A packing ring 104 and a packing plate 108 that also extend around drive shaft 98 push the V-seals 102 outwardly so that they form a liquid-tight barrier between the lid 90 and the drive shaft. Threaded fasteners 110 releasably hold the packing plate 108 against and to the lid 90.

Figure 6:
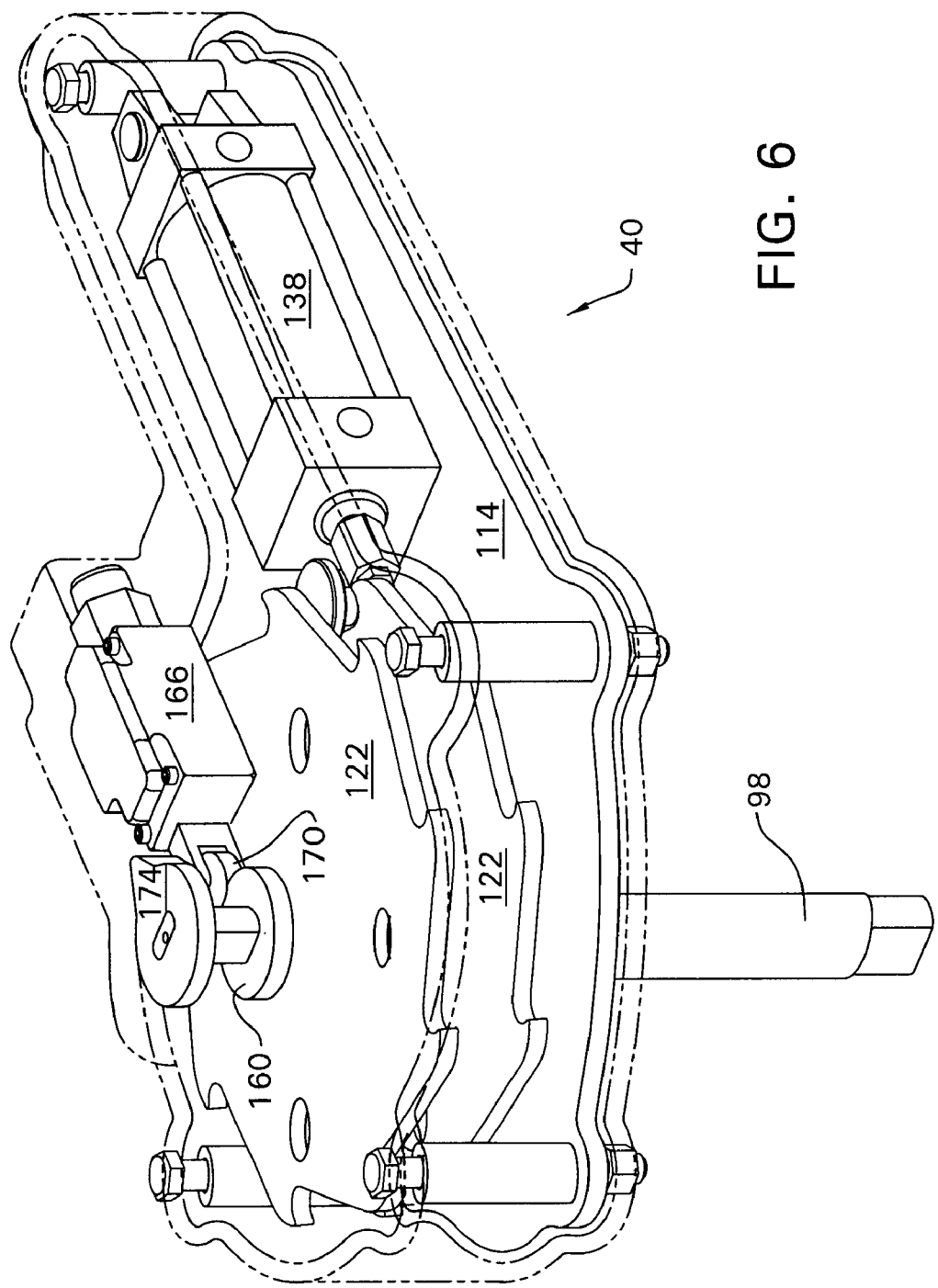
FIG. 6 is a perspective view of the flow diverter drive assembly.
Figure 7:
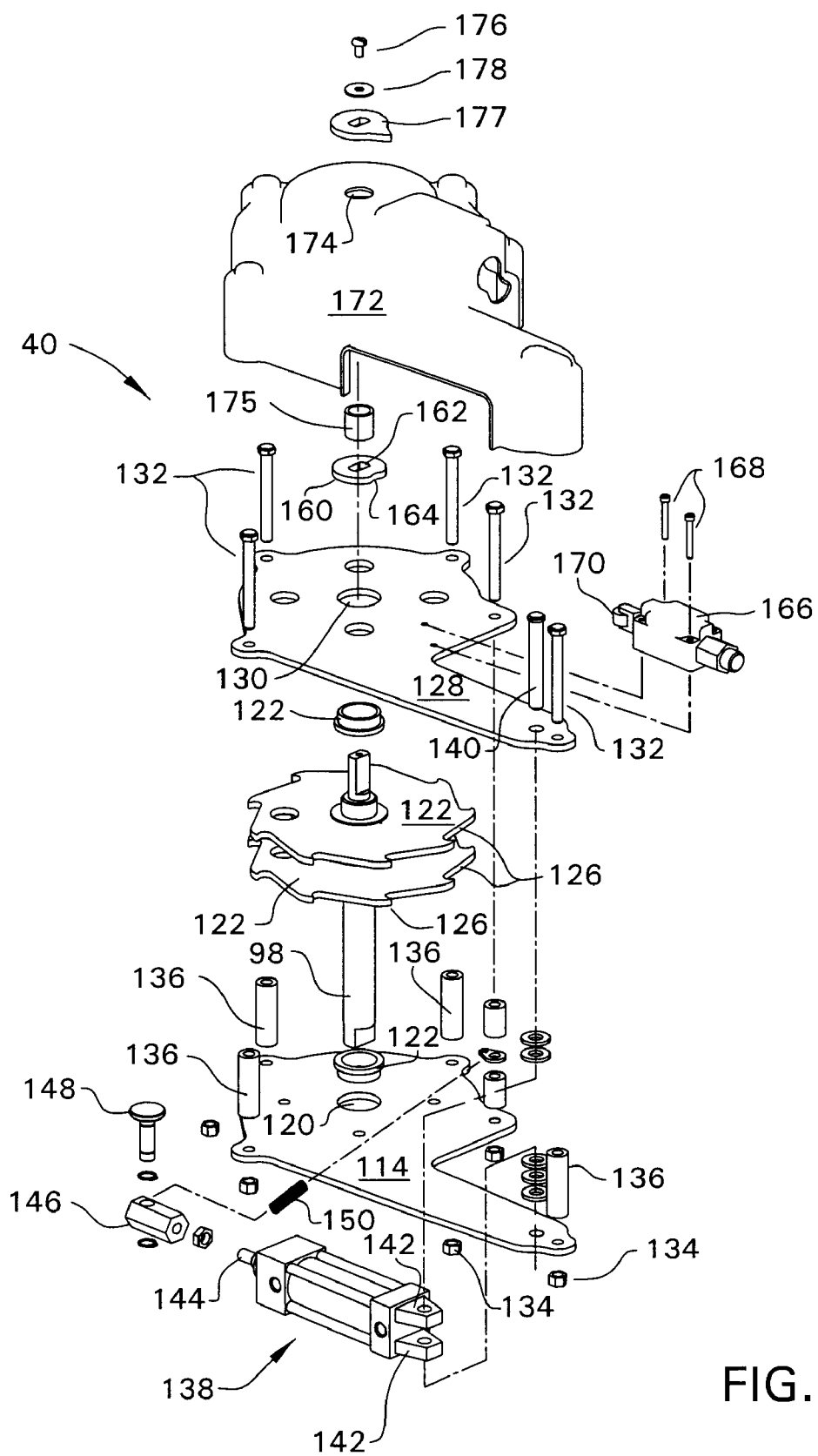
FIG. 7 is an exploded view of the components forming the drive assembly.

The drive assembly 40 is now described by reference to FIGS. 6 and 7. The drive assembly 40 includes a base plate 114 to which other components of the assembly 40 are mounted. The base plate 114 is itself mounted to a set of posts 116 that are integrally formed with lid 90 and that extend upwardly from the surface of the lid. Fasteners (not illustrated) secure the base plate 114 to posts 116. Drive shaft 98 extends through an opening 120 in base plate 114. A bushing 122 seated in the outer perimeter of opening 120 provides a low friction interface between drive shaft 98 and the base plate 114 so that the drive shaft can freely rotate relative to the base plate.

A pair of spaced apart drive gears 122 is fixedly secured to the drive shaft 98. Drive gears 122 are formed with teeth 126. The drive gears are formed so that teeth 126 are radially spaced 40° apart from each other. A top plate 128 is located over the drive gears 122. The top plate 128 is formed with an opening 130 through which the top end of the drive shaft 98 extends. A second bushing 122 seated in opening 130 provides a low friction interface between the drive shaft 98 and top plate 128. Bolts 132 and nuts 134 secure top plate 128 to base plate 114. The bolts 132 extend through spacer tubes 136 that hold top plate 128 away from base plate 114.

The drive gears 122 are rotated in step-wise pattern by a pneumatic actuator 138. One end of actuator 138 is pivotally connected between plates 114 and 128 by a pin 140. Pin 140 extends through tabs 142 formed in the rear end of the actuator 138. Actuator 138 includes a piston rod 144 that is selectively extended out from and retracted back into the actuator. A hexagonal shaped clevis 146 is secured over the exposed end of piston rod 144. A vertically aligned pin 148 extends through an opening in the end of clevis 146 distal from the actuator 138. The actuator 138 is mounted to plates 114 and 128 so that the clevis 146 is located adjacent the interstitial space between the drive gears 122. The pin 148 is positioned so that the opposed portions of the pin that extend out of the clevis abut the outer perimeters of the drive gears 122. Snap rings 149 hold pin 148 in a fixed position relative to clevis 146. A spring 150 extends between the clevis and one of the bolts 132. More particularly spring 150 is secured to a clip 145 that is fitted to the bolt 132. The clip 145 is sandwiched between two spacer tubes 143 that hold the clip between plates 122 and 128. Owing to its position, spring 150 holds clevis 146 so that pin 148 is held against the drive gears 122.

Piston rod 144 is extended out of and retracted back into the actuator 138 based on the selective application of pressurized air to the actuator. This air comes from source 154 (FIG. 1) not part of this invention. A valve 156 controls the application of air from source 154 to actuator 138 in order to extend and retract piston 144. The programmable logic controller 44 sets the state of the valve 156.

A sub-assembly for monitoring the rotational position of the flow diverter is located above top plate 128. Specifically a cam 160 is fitted to the portion of the drive shaft 98 that projects above the top plate 128. The cam 160 is formed with a rectangularly-shaped center opening 162 to facilitate the fitting of the cam over a similarly shaped section of the drive shaft 98. Thus, the cam 160 rotates in unison with the rotation of the drive shaft 98. Cam 160 is further formed so as to have an outer profile with a generally constant diameter profile. The cam 160 is further formed to have, in its outer perimeter, an indentation 164.

A follower switch 166 is mounted to the top plate 128 to monitor the rotational position of the cam 160. Bolts 168 secure the follower switch 166 to the top plate 128. The follower switch 166 includes a follower member 170 that is biased outwardly and positioned to abut the outer perimeter of cam 160. The flow diverter 34 of the filter assembly 20 of this invention has what is referred to as a "home" position. The diverter is in this position when the diverter inlet section 64 is aligned with the arcuate section of the inlet manifold 64 subtended by and located below inlet port 52. When the flow diverter is in the home position it is not in registration with any of the outlet ports 54 to which the filter element sub-assemblies 26 are connected. The filter assembly 20 is further constructed so that, when the flow diverter 34 is in the home position, cam 160 is positioned so that the cam indentation 164 is in registration with switch follower member 170. Follower switch 166 outputs a signal that indicates whether or not follower member 170 is in registration with cam indentation 170. The signal generated by the follower switch 166 is applied to the programmable logic controller 44.

A cover 172 is disposed over the base and top plates 114 and 128, respectively, of the drive assembly as well as the components mounted to the plates. The head end of the drive shaft 98 extends through an opening 174 in the cover. A tubular bushing 175 provides a low friction interface between the drive shaft 98 and the cover 172. A pointer plate 177 is mounted to the portion of the drive shaft 98 that extends out of the cover 172. Pointer plate 177 is fitted to the drive shaft 98 in a manner similar to which cam 160 is fitted to the drive shaft. Screw 176 and washer 178 hold the pointer plate 177 to the drive shaft. The pointer plate 177 is formed with a pointer 176 that provides a visual indication of the rotational position of the flow diverter.

Figure 8:
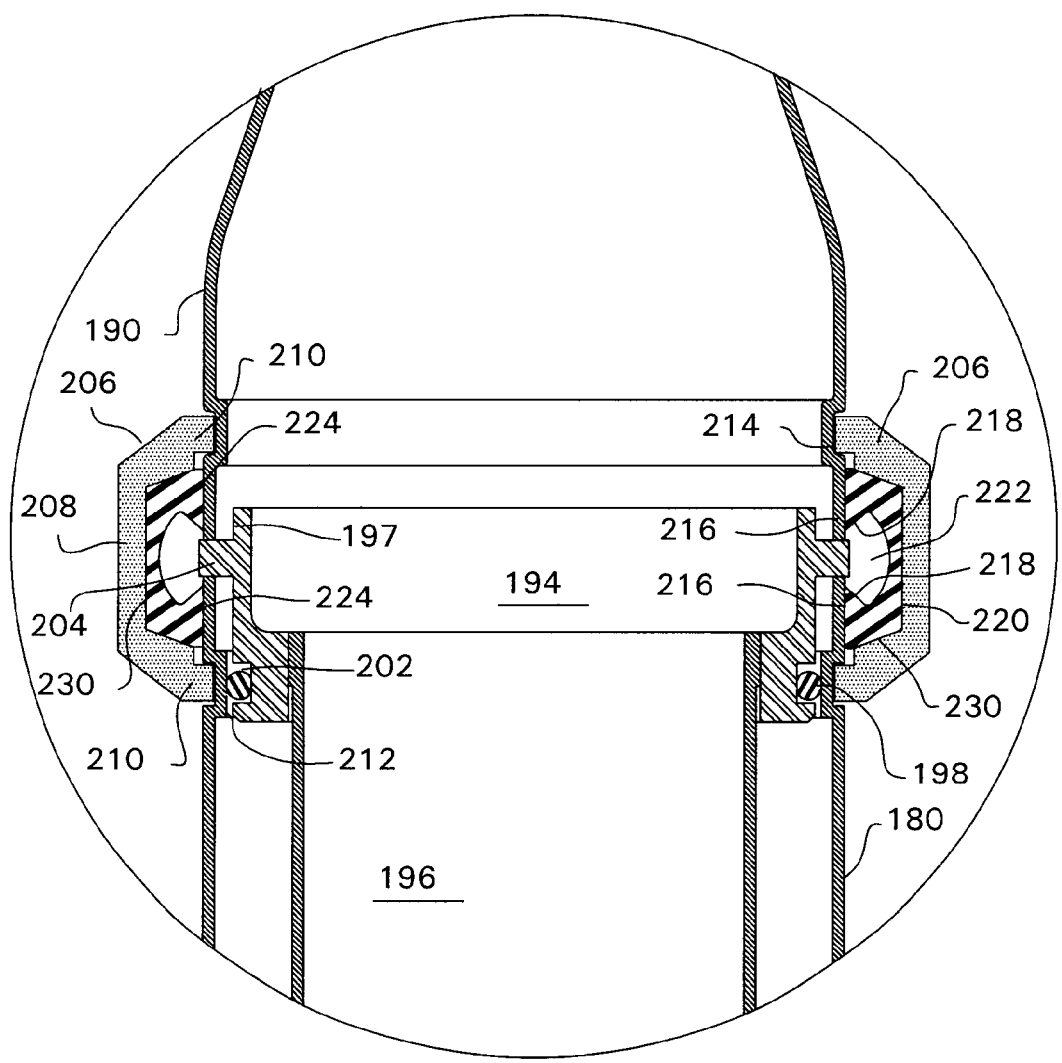
FIG. 8 is a cross sectional view of the filter element seal sub-assembly.

The structure of a filter element sub-assembly 26 is now described by reference to FIGS. 3 and 8. Each sub-assembly 26 includes a tubular shaped body 180. Body 180 has an elbow shaped inlet end 182 and a generally vertically aligned main section 184. A coupling member 186 and an O-ring seal 188 sealing couple the open end of body inlet end 182 to the open end of the associated discharge nipple 56. The filter element 28 integral with each sub-assembly 26 is seated inside the body main section 184. An elbow tube 190 is fitted over the open end of body main section 184 and the filter element 28. The elbow tube 190 functions as the flow path from body 180 into the outlet manifold 30.

The filter element 28 has a generally ring-shaped flange 194. The flange is formed of material, typically metal, that will not corrode when exposed to the fluid stream being filtered. One or more filter members 196 are suspended from flange 194. The particular type of filter element secured to the flange 194 is a function of the liquid that is to be filtered and the material that is to be removed from the flow stream. For example, one such filter member 196 can be a single cylindrical member formed from wire wrapped in a helical pattern around supporting stringers. The open top end of the filter member 196 is secured to an annular inner wall of the flange 194.

Alternatively, plural filter members may be secured to the flange. The flange of this type of filter element is formed to have a solid, disk shaped base. The filter members are sealingly secured to openings formed in the flange base.

Filter element flange 194 is formed to have a generally constant diameter outer wall 197. Flange 194 is dimensioned so that the outer wall 197 has a diameter slightly less than that of the adjacent inner wall of body main section 184 in which the filter member 196 is seated. An O-ring 198 is fitted in a groove 202 that extends inwardly from the outer wall 197 of the flange 194. Groove 202 and O-ring 198 are positioned so that the O-ring abuts the inner wall of the body main section 184 below the open end of the body. Flange 194 is also formed to have a lip 204 that extends circumferentially around and outwardly from the flange outer wall 197. The components of the filter element sub-assembly 26 are further dimensioned so that lip 204 extends a short distance beyond the adjacent outer wall of body main section 184. Thus, when the filter element 28 is seated in the body 180, lip 204 seats over the open end of the body. The lip 204 serves as the portion of the flange 194 from which the remaining components of the filter element 28 are suspended.

The elbow tube 190 is seated over the end of the filter element flange 194 that extends out of body 180. The end of the elbow tube thus seats against the face of flange lip 204 opposite the lip face seated against body 180. A coupling assembly secures the body 180 and elbow tube 190 together, holds the filter element 26 in position and provides a seal around the outlet end of the filter element. The coupling assembly includes two coupling members 206. Each coupling member 206 has a main body 208 that has a generally semicircular shape. Formed integrally with each member main body 208 are inwardly directed, semi-circular ribs 210. One rib 210 is located around the top of the main body 208; the second rib 210 is located around the base of the main body.

When the coupling members 206 are fitted in position, the lower rib 210 seats in a complementary annular groove 212 formed in the outer wall of the main body 180 a small distance below its open end. The upper rib 210 seats in an annular groove 214 formed in the outer wall of the elbow tube a small distance above the tube open end. Tabs 216 extend outwardly from the opposed ends of the member main bodies 208. When the coupling assembly 205 is assembled, fasteners 218 extend between the tabs 216 adjacent where the ends of the coupling members meet. The coupling assembly also includes a generally ring-shaped seal 220 formed of resilient material. Seal 220 is formed to define a void space 222 that extends circumferentially around the seal. The seal 220 is further formed so that the inner portion thereof has two opposed lips 224. The lips 224 are spaced apart from each other a small distance to provide an access therebetween into the void space 222. The lips 224 are shaped to have coplanar outer surfaces 226 that collectively define the inner wall of the seal. Each lip has an angled surface 228 that partially defines the void space 222. Each angled surface 228 extends diagonally away from the edge of the seal outer surface 226 with which the angled surface 228 is associated.

The filter element 28, the body 180 and elbow tube of the sub-assembly 26 of this invention are assembled by first placing the seal 220 around the open end of the body 180. Filter element 28 is then inserted in the body 180. In the process of fitting the filter element 28 in position, the flange lip 204 is seated against the open end of the body 180. Also, seal 220 is positioned around flange lip 204 so that the lips abut the opposed face surfaces of the lip 204. Elbow tube 190 is positioned over the portion of the flange 194 located above flange lip 204. Thus, the outer surface 226 of a first one of the seal lips is seated against the outer wall of the body 180; the outer surface 226 of the second seal lip is seated against the outer wall of the elbow tube 190.

Once the position of the elbow tube 190 and seal 220 are set, coupling members 206 are fitted in place. The inner surface of each coupling member is formed to define a curved groove 230 in which a semi-spherical portion of the seal 220 is seated. The fasteners 208 clamp the coupling members 206 together.

Returning to FIG. 3, it can be seen that the outlet manifold 30 is provided with a number of tube-shaped inlet nipples 234. A coupling member 186 and an O-ring seal 188 sealing couple the discharge end of each elbow tube 190 to the inlet end of an associated one of the nipples 234.

The filter assembly 20 of this invention is used by flowing the liquid to be filtered under pressure into the inlet manifold 24. As long as none of the filer elements 28 are not being backwashed, the valve 39 is in the closed state. Liquid may flow into the flow diverter 34 and drain pipe 36. After the flow diverter 34 and drain pipe 36 become filled with liquid, flow into these components stops. The liquid does, however, flow through the discharge nipples 56 into the filter element sub-assemblies 26. The liquid then flows through the filter members 196 integral with the filter elements 26. During this part of the flow process, the material the filter element is intended to capture becomes trapped on the outer surface of the filter members 196. The filtered liquid flows into the center of the filter member 196 and, from there, out through the top of the element flange 194.

The liquid discharged from the filter element 28 is under pressure. Consequently, this liquid flows in the interstitial gap between the end face of elbow tube 190 and flange lip 204. The liquid then flows into the seal void space 222 and through the interstitial gap between the flange lip 204 and the end face of element body 180. Continued flow of the liquid is, however, blocked by O-ring 198. Thus, eventually, the seal void space 222 fills with liquid. The liquid filling the void space 222 causes the seal 220 to expand. The expansion of the seal urges the seal against the adjacent surfaces of the coupling members 206. The expansion of the seal 220 also urges the lower-located seal lip 224 against the outer surface of the assembly body 180; the upper-located seal lip 224 is urged against the outer surface of elbow tube 190. Thus, the expansion of the seal 220 causes the seal to form a liquid-tight barrier against the components against which it abuts.

The filtered liquid then flows from the filter element sub-assemblies into the outlet manifold 30. The filtered liquid is then discharged from the assembly through outlet pipe 32.

Figure 9:
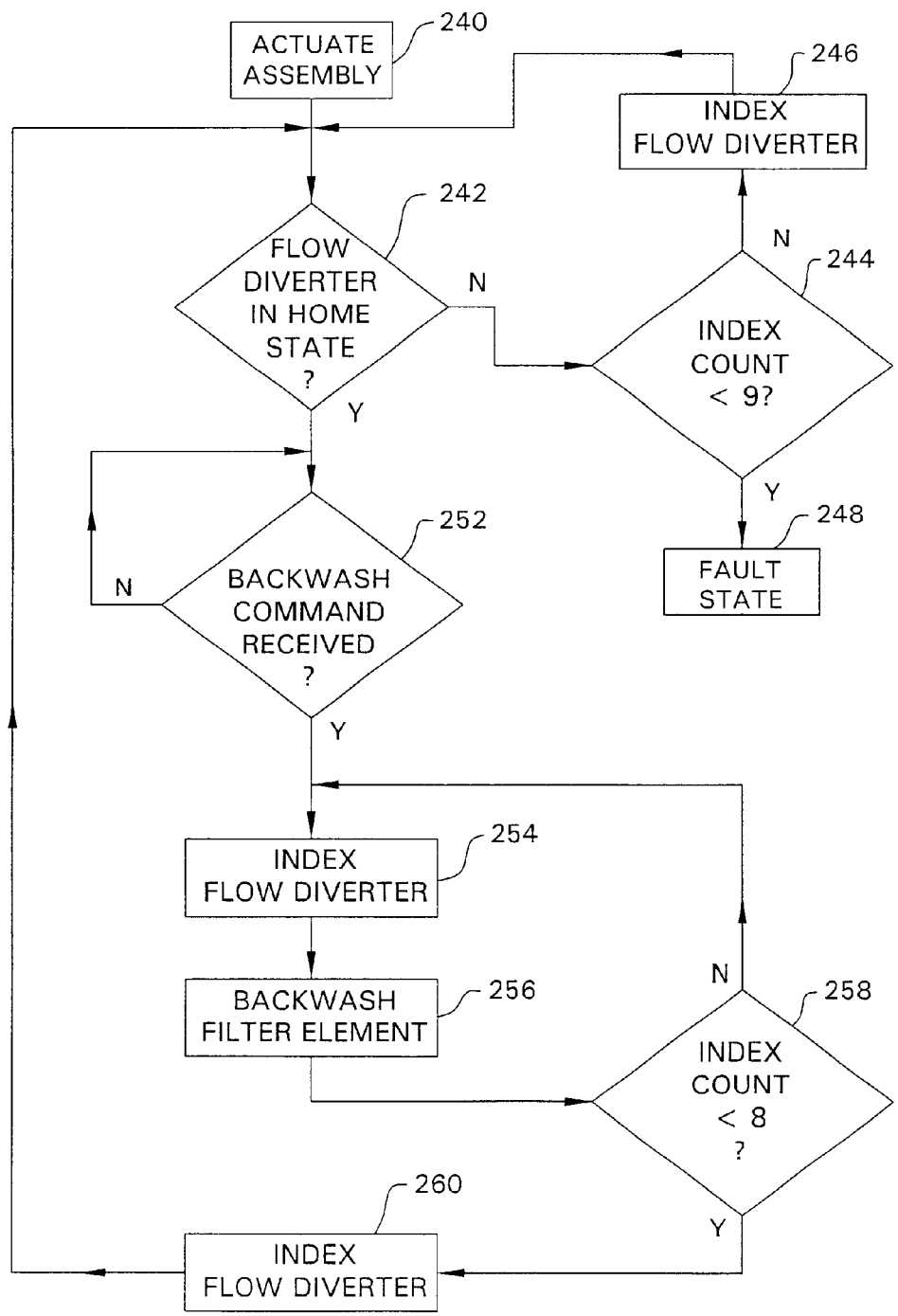
FIG. 9 is a flow chart of the process steps through which the programmable logic controller cycles in order to regulate the backwashing of the filter assembly.

Over time, the outer surfaces of the filter members 196 become caked with the removed material. This material impedes the flow of liquid across the filter members 196. In order to clean this material off the filter members, they are backwashed. The process steps through which the filter assembly and more particularly, the programmable logic controller 44, cycles in order to backwash the filter members 196 is now described by reference to the flow chart of FIG. 9. Initially, the assembly, the programmable logic controller is actuated as represented by step 240. After actuation, the programmable logic controller 44 monitors the signal generated by follower switch 166 to determine whether or not the flow diverter 34 is in the home state, step 242. This determination is made because there is always a possibility that after the last actuation of the drive assembly 40, the flow diverter may not be so positioned. This could happen if, for example, the drive assembly 40 is manually shut off before all of the filter elements 28 have been backwashed.

If it is determined that the flow diverter is not in the home state, programmable logic controller 44 attempts to reset the flow diverter. As part of this process, the programmable logic controller 44 determines how many times the flow diverter has been indexed, step 244. This step, step 244, may not be executed the first time the programmable logic controller 44 cycles through the flow diverter resetting cycle. The programmable logic controller then indexes the flow diverter, step 246. In this step, signals are set to valve 156 to regulate the flow of pressurized air to actuator 138. Specifically, the actuator 138 is manipulated so that piston rod 144 is first extended out of the actuator. This displacement of the piston rod 144 urges pin 148 against the drive gears 122. This movement forces the rotation of the drive gears 122, and through drive shaft 98 and drive rod 88, the like rotation of the flow diverter 34. Owing to the dimensioning of the drive gears 122 and the piston rod 144, each time the piston rod 144 is extended, the drive gears 122, and therefore the flow diverter 34, can only be displaced a maximum of 40°. Once the piston rod 144 is extended, the programmable logic controller 44 resets valve 156 so as to cause the piston rod to retract back into the actuator 138.

It should also be understood that, in step 246, the value in a field indicating the number of times the flow diverter has been index in order to return it to the home state is incremented by one. Prior to the initial execution of the diverter resetting cycle, the count in this field will have been zeroed out.

After the flow diverter 34 is indexed, the programmable logic controller 44 again executes step 242 to determine if the flow diverter now is in the home state. If the flow diverter 34 is still not so positioned, during the subsequent executions of the resetting cycle, step 244 is executed. Eventually, if the flow diverter 34 is not reset into the home position the drive gears will rotate through a complete circle. In the described version of this invention, this occurs after the flow diverter is indexed nine times. Accordingly, if in step 244 it is determined that the flow diverter has been executed nine times the assembly is considered in a fault state, step 248. If the programmable logic controller makes this determination, the controller 44 actuates the appropriate internal audio and visual alarms to provide personnel an indication of this condition.

Returning to step 242, it should be recognized that, in this step, the programmable logic controller 44 will more typically determine that the flow diverter 34 is in the home position. When the flow diverter is in this state, the assembly 20 can be used in a normal manner. Programmable logic controller 44 then waits for a command to initiate backwashing, step 252. In step 252, the backwash control routine in the programmable logic controller 44 waits to receive an initiate backwash command based on one of three events occurring. First, the programmable logic controller is set to initiate backwashing if the signal from switch 42 indicates that the fluid pressure in the outlet manifold 30 is below the pressure in the inlet manifold 24 by a set amount. This pressure drop serves as a primary indication that the filter members have become clogged with removed material. Depending on the liquid flowed through the assembly 20, this pressure is often between 7 and 25 psi. Alternatively, the programmable logic controller 44 may automatically initiate backwashing if an internal timer indicates that a given period of time has elapsed since the filter elements were last subjected to backwashing. The programmable logic controller 44 may also initiate backwashing if a command entered through the keypad indicates a system operator has determined that such backwashing is desirable.

Once the backwash control routine receives an indication that backwashing should be initiated, the programmable logic controller 44 proceeds to index the flow diverter from the home position to the adjacent outlet port 54 in the inlet manifold, step 254. As part of step 254, a counter internal to the programmable logic controller 44 which maintains a count of how many times the flow diverter has been indexed is incremented. Prior to the first indexing of the flow diverter, this count is zeroed-out.

Then, the filter element 28 in communication with the outlet port 54 is then backwashed, step 256. In step 256 valve 39 is opened to allow fluid flow through the drain tube 36 and drain pipe 38. Thus, once valve 39 is opened, the pressure head of the fluid in the outlet manifold 30 forces a fraction of the fluid in the outlet manifold 30 to flow in a reverse direction to its normal pattern through the selected filter element 28. This fluid flow forces the caked material off the outer surface of the filter member 196 integral with the filter element 28. The caked material and the backwash fluid flow out of the assembly 20 through drain tube 36 and drain pipe 38.

It should be understood that, whenever valve 39 is open, a small volume of fluid might flow into the flow diverter through the interstitial gap between the face of seal 70 and the inlet manifold 24. A small volume of liquid may also flow from the inlet manifold into the drain tube 36 through gaps around bushing 66. These volumes of liquid, however, will not be a noticeable fraction of the liquid that is pumped into the assembly 20.

The programmable logic controller 44 is set to allow the backwashing of a filter element 28 occur for a given amount of time. Typically this period is between 5 and 10 seconds. For some process streams, the backwash period may approach one minute. Once the backwashing of an individual filer element is completed, the programmable logic controller 44 closes valve 39.

Programmable logic controller 44 then, in step 258, determines how many times the flow diverter has been indexed. This determination is made in order to evaluate whether or not all the filter elements have been backwashed. In the described version of the invention, the flow diverter is indexed eight times to be placed in registration with each filter element 28. If the flow diverter 34 has been indexed less than the requisite number of times, the programmable logic controller 44 reexcutes steps 254, 256 and 258. In the reexecution of the indexing step 254, the flow diverter 34 is advanced to the output port 54 adjacent the outlet port with which it is currently in registration.

Eventually though, it is determined in step 258, that the flow diverter 34 has been positioned against each of the outlet ports 54. Each of the filter elements 28 has thus been backwashed. The flow diverter 34 is then indexed a final time, step 260, to return the flow diverter to the home position.

After step 260 is executed, the programmable logic controller 44 reexecutes step 242 in order to again determine whether or not the flow diverter is in the home position. This determination is made to verify that no malfunction occurred during the backwash process that would have caused the flow diverter to fall out of alignment. If the flow diverter 34 is properly aligned, the programmable logic controller 44 returns to step 252 to await a command to initiate the backwashing process. If the flow diverter is not properly aligned, steps 244, 246 and 242 are sequentially reexecuted. These steps 244, 246 and 242 cyclically executed until the programmable logic controller determines that the flow diverter 34 is in the home position or the assembly is in the fault state, step 250.

The filter assembly 20 of this invention is designed so that the flow diverter inlet section 64, the section of the flow diverter that extends away from the longitudinal axis of the inlet manifold 24, is spaced away from the space subtended by manifold inlet port 52. Consequently, the fluid stream that flows into the manifold 24 through port 52 does not subject the flow diverter 34 to appreciable side loading. Since this side loading is substantially eliminated, drive assembly 40 is not provided with a complex braking system for preventing the side-loading-induced rotation of the flow diverter 34. The omission of the this type of braking system eliminates both the costs of providing it and the expenses associated with maintaining it.

Still another feature of the assembly 20 of this invention is that the inlet section 64 is not placed in sealing contact with the ends of the associated outlet ports 54. Similarly, the discharge end of the diverter outlet section 64 is not sealed into the associated receiving pipe 60. An advantage of this arrangement is that it eliminates the costs associated with having to provide liquid-tight barriers around these interfaces and the need to have to maintain the integrity of these barriers.

Moreover, still another advantage of the filter assembly of this invention is that each filter element sub-assembly 26 is constructed so that element O-ring 198 and the other components forming the coupling assembly collectively provide a liquid-tight barrier around the discharge end of the filter element 28, and releasably secure the filter element, body 180 and elbow tube 190 together. Collectively these components and element flange 194 are relatively economical to provide.

Accordingly, the filter assembly 20 of this invention offers an efficient way to filter liquid, while simultaneously backwashing one of its filter elements 28, and that is economical to both construct and operate.

Also, the programmable logic controller of the assembly 20 of this invention is designed to ensure that the flow diverter 34 is appropriately positioned during and after the backwashing process. If the programmable logic controller cannot cause the return of the flow diverter 34 to the appropriate position, the controller asserts an alarm so that operating personnel are made aware of the fault condition.

It should be understood that the foregoing description has been directed to one particular version of the invention and that other versions of the invention may vary from what has been described. For example, in one embodiment of the above versions of the invention, it is anticipated that the inlet pipe 22 and outlet pipe will have inner diameters of approximately 8 inches and the inner diameter of the filter element bodies will be, at its narrowest, approximately 4.2 inches. In this embodiment of the invention, the assembly 20 could filter material flowing at a rate of up to 2000 gal./min. The system is also capable of receiving process flows at pressures up to 250 psi. When operating the assembly 20, it is further recommended that the pressure head of the process stream into manifold 24 be at least two times the level of the differential pressure that is sensed and used to trigger backwashing. In other embodiments of the invention, the components may be of different dimensions. In these alternative versions of the invention, the characteristics of the process streams flowed through the assembly 20 will be different than those described above.

In the described version of the invention, the assembly 20 has eight separate filter element sub-assemblies 26. This is exemplary, other versions of the invention may have more or less individual filter element sub-assemblies 26.

It should further be clear that the invention may be assembled from components different from what has been described. For example, the inlet manifold 24, base 50, nipples 56 and ring 87 may be formed as a single casting. Transducers other than the described switch 42 may be used to monitor the pressure in the manifolds 24 and 30 in order to determine when the filter elements 28 should be subjected to backwashing. Each manifold 24 and 30 may be provided with its own pressure-sensitive transducer.

In the illustrated version of the assembly 20, flow diverter 34 is constructed so that the inlet section 62 is located below the space subtended by inlet port 52. Not all versions of the invention may be so configured. In some versions of the invention, the inlet section 62 of the flow diverter, the section that extends radially away from longitudinal axis of the inlet manifold 24, may be located above the space subtended by the inlet port 52. In these versions of the invention, the only portion of the flow diverter exposed to the liquid stream discharged through the inlet port will be a circular, symmetrically shaped portion of the outlet section 64. Since the flow stream is exposed to a portion of the flow diverter that has a symmetric profile, the flow stream will not subject the diverter to the side loading that necessitates the fitting of a brake system to the drive assembly 40.

Furthermore, it should be noted that in the illustrated versions of the invention, the home section of the inlet manifold shell 48, the section that does not have any outlet ports, is the section of the shell that is arcuately subtended by the inlet port 52. In other versions of the invention, this arcuate section of the shell 48 may be provided with outlet ports 54; the home section of the shell would be partially or completely arcuately spaced from the section of the shell that defines the inlet port 52.

Also, in the illustrated version of the invention, the outlet manifold 30 is shown located above the inlet manifold 24. This illustration should not be construed as limiting. In other versions of the invention, the components of the assembly 20 may have orientations relative to gravity and each other that are different from what has been described.

Moreover, while a flow diverter 34 is shown mounted only in the inlet manifold 24 of the assembly 20, other versions of the invention may not be so limited. For example, in other versions of the invention, flow diverters may be mounted in both the inlet manifold 24 and the outlet manifold 30. In these versions of the invention, the flow diverter mounted in the outlet manifold would have an inlet section positioned along the center axis of the manifold designed to receive a backwash liquid from a source external to the filter assembly. The outlet section of the flow diverter would be positioned to be selectively placed in registration with the inlet nipples 234. It should be understood that, in these versions of the invention, the portion of the flow diverter that projects asymmetrically away from the rest of the diverter is typically positioned to be spaced away from an outlet port through which the filtered liquid is discharged.

These versions of the invention would be provided when it is desirable to backwash the filter members 196 with a fluid other than the liquid the assembly is being used to filter. In these versions of the invention, the backwash liquid is introduced into the filter element to be backwashed through the flow diverter located in the outlet manifold 30. In these versions of the invention, a single drive assembly 40 may be employed to actuate both flow diverters. Alternatively, each flow diverter may be provided with its own drive assembly. This latter embodiment of the invention may be useful when it is desirable to provide a filter assembly of this invention that is capable of backwashing filter member 196 with either the filtered process liquid or an externally-supplied backwash liquid.

Also, it should be understood that the coupling assembly used to both provide a liquid tight barrier around the filter element 28 and releasably hold the filter element, the body 180 and elbow tube 190 together may be used with other filter assemblies than the one described. Moreover, it should be realized that in other versions of the invention, the two tubes forming the outer components of the filter element sub-assembly may have different shapes than what has been shown. Also, it may be desirable to place gaskets around the opposed annular faces of flange lip 204. These gaskets would reduce the extent to which liquid flows around these faces of the lip 204.

Accordingly, it is an object of the appended claims to cover all such modifications and variations that come within the true spirit and scope of the invention.

What is claimed is:

1. A filter element assembly, said assembly including:
    a first tube, said first tube having an outer diameter, an inner diameter and an open end;
    a filter unit, said filter unit including:
        a flange, said flange having a body with an outer surface wherein said body is dimensioned to be fitted in said open end of said first tube and a lip that extends radially away from the outer surface of said flange body, said lip having an outer diameter that is greater than the outer diameter of said first tube so that when said flange body is disposed in said first tube, said lip seats around the open end of said first tube;
        at least one filter member attached to said flange, said filter member having an open end adjacent said flange body; and
        a filter unit seal that extends between said flange body and an inner wall of said first tube for establishing a barrier between said first tube and said flange;
    a second tube, said second tube having an open end, said second tube being positioned so that the open end of said second tube is seated over said flange lip; and
    a clamp assembly, said clamp assembly including:
        a coupling unit, said coupling unit having a first and second spaced apart annular, inwardly extending ribs, said coupling unit being fitted around said first and second tubes so that the first said rib bears against said first tube and the second said rib bears against said second tube; and
        an annular seal located between said ribs of said coupling unit, said seal extending around said first tube, said flange lip and said second tube, said seal being shaped to have an annular void space wherein said flange lip is seated in the void space.

2. The filter element assembly of claim 1, wherein said coupling unit is formed from a plurality of arcuately shaped coupling members.

3. The filter element assembly of claim 1, wherein said coupling unit has an inner wall that defines an annular groove and said clamp assembly seal is seated in the groove.

4. The filter element assembly of claim 1, wherein said filter member extends from said flange so as to extend into said first tube.

5. The filter element assembly of claim 1, wherein said filter member is a single member that extends from said flange so as to extend into said first tube.

6. The filter element assembly of claim 1, wherein said clamp assembly seal is formed so that the seal void space in which said flange lip is seated is larger than the portion of said flange lip seated in the void space and said clamp assembly seal is further formed to have a first annular lip that extends around a section of said first tube against which said flange lip is seated and a second lip that extends around a section of said second tube adjacent said flange lip and each said annular lip defines a portion of the clamp assembly seal void space.

7. The filter element assembly of claim 6, where said clamp assembly seal is further formed so that each said annular lip abuts a portion of said flange lip.

8. The filter element assembly of claim 1, wherein said flange is formed so that a portion of said flange body extends beyond said lip into said second tube.

9. The filter element assembly of claim 1, wherein a portion of said flange body that is disposed in said first tube is formed with a groove and said filter unit seal is fitted in the groove formed in said flange body.

10. A filter element assembly, said filter element assembly including:
   first and second tubes, each said tube including an outer wall and an open end;
   a filter unit, said filter unit comprising:
      a ring, said ring at least partially disposed in the open end of said first tube and having a lip that is dimensioned to extend at least to the outer walls of said tubes, wherein said first and second tubes are positioned so that the open ends of said tubes abut said lip; and
      a filter member attached to said ring and positioned to extend into said first tube;
   a first seal disposed between said ring and an inner wall of said first tube;
   a second seal disposed around the open end of said first tube, said ring lip and the open end of said second tube, said second seal having an inwardly directed opening wherein said ring lip is seated in the opening; and
   a clamp, said clamp having a body that surrounds said second seal, a first rib that extends from said clamp body that engages said first tube and a second rib that extends from said clamp body that engages said second tube.

11. The filter element assembly of claim 10, wherein said clamp is formed from a plurality of arcuately shaped coupling members.

12. The filter element assembly of claim 10, wherein said filter member is a single member that extends from said ring.

13. The filter element assembly of claim 10, wherein said second seal is formed so that the opening in which said ring lip is seated is larger than the portion of said ring lip seated in the opening and said second seal is further formed to have a first annular lip that extends around a section of said first tube that abuts said ring lip and a second lip that extends around a section of said second tube that abuts said ring lip and each said annular lip defines a portion of the second seal opening.

14. The filter element assembly of claim 13, where said second seal is further formed so that each said annular lip abuts a portion of said ring lip.

15. The filter element assembly of claim 10, wherein said ring is shaped to have a section that extends beyond said lip into said second tube.

16. The filter element assembly of claim 10, wherein a portion of said ring that is disposed in said first tube is formed with a groove and said first seal is fitted in the groove formed in said ring.

17. A filter element assembly, said filter element assembly including:
   first and second tubes, each said tube including an outer wall and an open end;
   a filter unit, said filter unit including:
      a flange, said flange at least partially disposed in the open end of said first tube and having a lip that is dimensioned to extend beyond the outer walls of said tubes, wherein said first and second tubes are positioned so that the open ends of said tubes abut said lip; and
      a filter member attached to said flange and positioned to extend into said first tube;
   a first seal disposed around the open end of said first tube, said flange lip and the open end of said second tube, said first seal shaped to define an opening in which the section of said flange lip that extends beyond the outer walls of said tubes is seated, the opening being larger than the section of said flange lip seated therein, a first lip disposed against the open end of said first tube and a second lip disposed against the open end of said second tube and said seal lips at least partially define the opening in said first seal; and
   a clamp, said clamp having a body that surrounds said first seal, a first rib that extends from said clamp body that engages said first tube and a second rib that extends from said clamp body that engages said second tube.

18. The filter element assembly of claim 17, wherein said clamp is formed from a plurality of arcuately shaped coupling members.

19. The filter element assembly of claim 17, wherein said clamp body is formed with an inwardly directed groove and said first seal is seated in the groove.

20. The filter element assembly of claim 17 wherein said filter member is a single member that extends from said flange.

21. The filter element assembly of claim 17, where said first seal is further formed so that each said first seal lip abuts a portion of said flange lip.

22. The filter element assembly of claim 17, wherein said flange is formed so that a portion of said flange extends beyond said flange lip into said second tube.

23. The filter element assembly of claim 17, further including a second seal extending between a portion of said flange disposed in said first tube and said first tube.

* * * * *